(12) United States Patent
Hua et al.

(10) Patent No.: US 8,760,312 B2
(45) Date of Patent: Jun. 24, 2014

(54) COMPONENT INSTALLATION GUIDANCE

(75) Inventors: Chanh V. Hua, Houston, TX (US);
Vincent Nguyen, Houston, TX (US);
Binh Nguyen, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 420 days.

(21) Appl. No.: 13/126,133

(22) PCT Filed: Oct. 29, 2008

(86) PCT No.: PCT/US2008/081631
§ 371 (c)(1),
(2), (4) Date: Apr. 26, 2011

(87) PCT Pub. No.: WO2010/050940
PCT Pub. Date: May 6, 2010

(65) Prior Publication Data
US 2011/0205078 A1    Aug. 25, 2011

(51) Int. Cl.
*H05K 7/10* (2006.01)
*G06F 11/00* (2006.01)
*G08B 21/00* (2006.01)
*G08B 23/00* (2006.01)

(52) U.S. Cl.
USPC .......... 340/691.1; 340/693.5; 340/686.1; 340/686.2; 340/687; 714/48; 710/301

(58) Field of Classification Search
None
See application file for complete search history.

(56) References Cited

U.S. PATENT DOCUMENTS

| | | | |
|---|---|---|---|
| 5,774,647 A * | 6/1998 | Raynham et al. | 714/48 |
| 5,991,158 A | 11/1999 | Chan et al. | |
| 6,587,909 B1 * | 7/2003 | Olarig et al. | 710/302 |
| 6,820,156 B1 | 11/2004 | Miller et al. | |
| 7,116,241 B2 | 10/2006 | Post et al. | |
| 7,394,652 B1 | 7/2008 | Jochym et al. | |
| 2004/0225798 A1 | 11/2004 | Miller | |
| 2006/0059325 A1 * | 3/2006 | Milne et al. | 711/200 |
| 2006/0064526 A1 * | 3/2006 | Smith et al. | 710/104 |
| 2008/0148109 A1 | 6/2008 | Bashor et al. | |
| 2009/0037900 A1 * | 2/2009 | von Khurja et al. | 717/173 |

FOREIGN PATENT DOCUMENTS

CN    1752942    3/2006
KR    19980051001    9/1998

OTHER PUBLICATIONS

HP LaserJet P2015 Series User Guide, Edition 1, Sep. 2006, p. 117.
Blinking Links, Copyright 2008 Hewlett-Packard Development Company, L.P. [Online] http://h10025.www1.hp.com/ewfrf/wc/document?lc=en&cc=us&docname=c01115435&dl . . .
International Search Report and Written Opinion, dated Jun. 30, 2009, 10 pages.

* cited by examiner

*Primary Examiner* — George Bugg
*Assistant Examiner* — Renee Dorsey

(57) ABSTRACT

In accordance with embodiments, a system includes a plurality of component slots and at least one indicator associated with each of said slots. The system also includes a controller coupled to the indicators. The indicators selectively provide installation guidance of components into said slots based on signals from the controller.

20 Claims, 3 Drawing Sheets

COMPONENT INSTALLATION GUIDANCE

BACKGROUND

For many electronic devices, the installation of components is becoming increasingly complicated. For example, some computer systems can support up to 32 or 64 separate memory modules (e.g., DIMMs), where the order of installation can affect the overall performance of the memory modules. An existing technique to determine if such memory modules have been properly installed involves checking memory module attributes during a boot process and notifying a user if an invalid or suboptimal configuration is being used. This technique may involve several reboots to fix the installation order of memory modules, in part because users have difficulty identifying memory module rank (e.g., single, dual and quad) or other attributes that affect installation order.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Embodiments of the disclosure are directed to methods and systems for providing component installation guidance. As used herein, "installation guidance" refers to a series of installation steps and, if necessary, correction steps that are dynamically provided by visual and/or audio indicators. In at least some embodiments, indicators (e.g., light emitting diodes) are provided for each of a plurality of component slots. A controller directs the indicators to provide installation guidance based on input parameters. For example, installation guidance for memory modules may be based on processor type identifiers, the number of memory channels supported by a processor, component type identifiers, component rank identifiers or other input parameters. In at least some embodiments, component installation guidance is provided while a corresponding electronic device is powered off, in hibernation, or is otherwise in a low-power state. In such embodiments, component installation guidance is powered by battery power or other auxiliary power sources that are available while the corresponding electronic device is in the low-power state.

Figure 1:
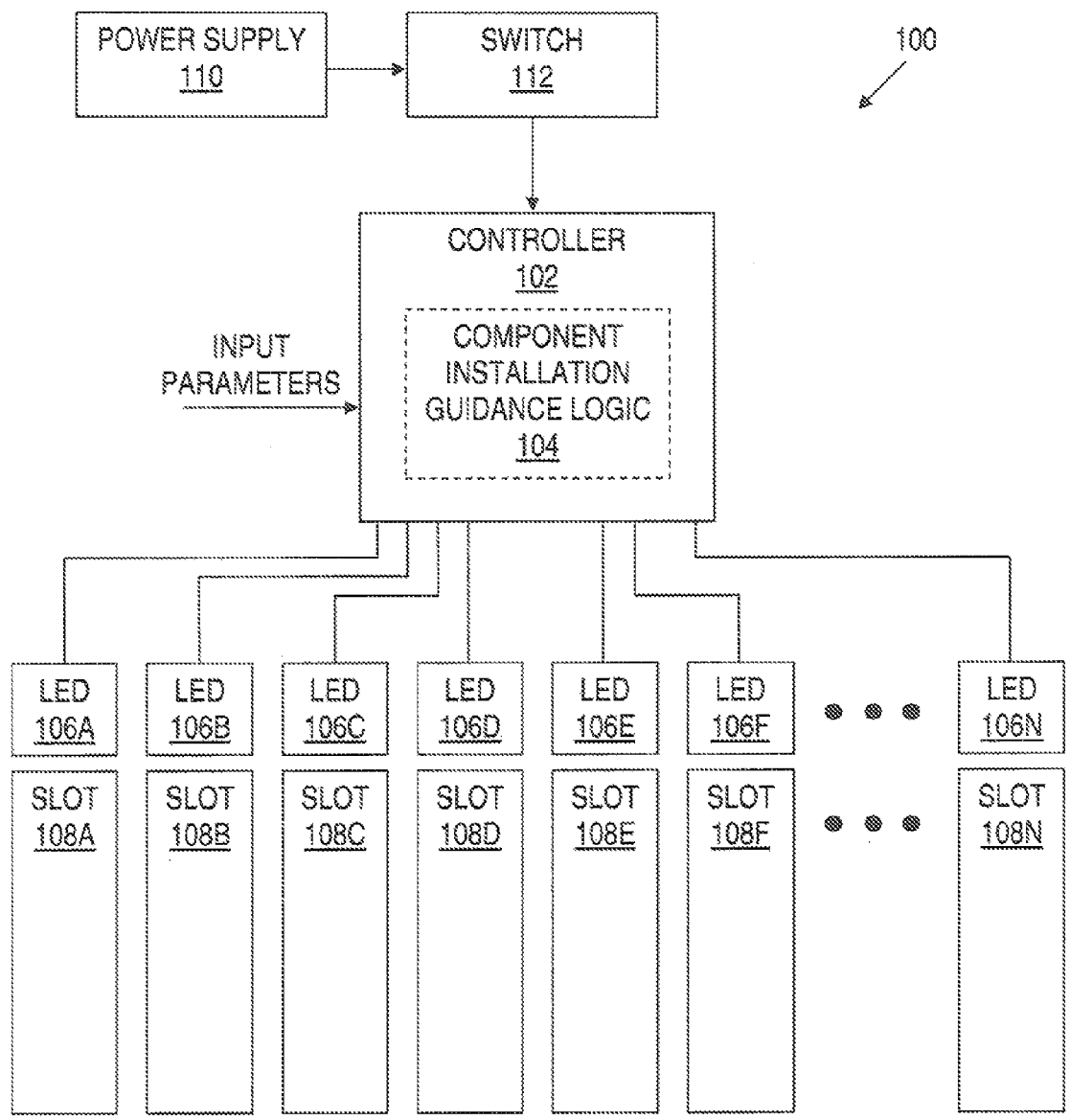
FIG. 1 shows a system in accordance with embodiments of the disclosure.

FIG. 1 shows a system 100 in accordance with embodiments of the disclosure. As shown, the system 100 comprises a controller 102 coupled to a plurality of light-emitting diodes (LEDs) 106A-106N. Other types of visual and/or audio indicators may be used instead of, or in addition to, LEDs. In accordance with at least some embodiments, each of the LEDs 106A-106N corresponds to a different slot 108A-108N.

As shown, the controller 102 comprises component installation guidance logic 104, which may correspond to hardware or processor-executed firmware or software. The component installation guidance logic 104 directs the LEDs 106A-106N based on input parameters received or stored by the controller 102. As an example, installation guidance for memory modules may be based on processor type identifiers, the number of memory channels supported by a processor, component type identifiers, component rank identifiers or other input parameters. Such parameters can be stored by the controller 102 before the installation process. Alternatively, the controller 102 obtains such parameters as part of the installation process. In either case, the controller 102 may request and receive the parameters from components that store or have access to the parameters (e.g., a non-volatile memory, a DIMM module, a processor, or a BIOS chip). If the controller 102 requests the parameters while such components are powered off (e.g., during the low-power state of the corresponding electronic device), an auxiliary power source can be used to activate relevant components (at least temporarily) so that the parameters can be requested and received by the controller 102.

Table 1 shows illustrative installation rules in accordance with some embodiments.

TABLE 1

| LED STATUS | ACTION |
| --- | --- |
| Blinking LED next to empty slot | Add memory module to the slot |
| Blinking LEDs next to occupied slot and next to empty slot | Remove memory module from occupied slot and reinstall in the empty slot (wrong location) |
| Blinking LEDs next to two occupied slots | Swap memory modules (rank violation) |

As shown in Table 1, a blinking LED next to an empty slot indicates that a memory module should be added to the empty slot. Further, blinking LEDs next to an occupied slot and next to an empty slot indicate that the memory module in the occupied slot should be removed and reinstalled in the empty slot. Further, blinking LEDs next to two occupied slots indicates that the memory modules occupying the slots should be swapped.

As an example based on FIG. 1, if slot 108A is empty and LED 108A is blinking, a memory module should be added to slot 108A. If slot 108A is occupied and LED 106A is blinking and if slot 1086 is empty and LED 108B is blinking, the memory module in slot 108A should be removed and reinstalled in slot 108B. If slot 108A is occupied and LED 106A is blinking and if slot 108B is occupied and LED 108B is blinking, the memory modules in slots 108A and 1086 should be swapped.

The installation rules of Table 1 are illustrative only and embodiments are not limited thereto. For example, in some embodiments, solid lights rather than blinking lights can be used to indicate the actions of Table 1. In general, visual and/or audio indicators dynamically direct or correct installation steps based on rules such as those described in Table 1 or other rules.

As shown in FIG. 1, the controller 102 is powered by a power supply 110 via a switch 112. In at least some embodiments, the power supply 110 comprises a battery that enables component installation guidance to be provided even while the corresponding electronic device is in a low-power state. Alternatively, the power supply 110 comprises an auxiliary power supply (e.g., an auxiliary power rail from an electronic device's main power supply) to maintain power for use during the installation process. The power supply 110 may be any portable or plug-in power option and is not limited to a particular embodiment. Regardless of the power supply type, in some embodiments, components providing input parameters to the controller 102 during the installation process may be powered (at least temporarily) by the power supply 110. Also, the LEDs 106A-106N may receive power (at least temporarily) from the power supply 110 during the installation process.

Figure 2:
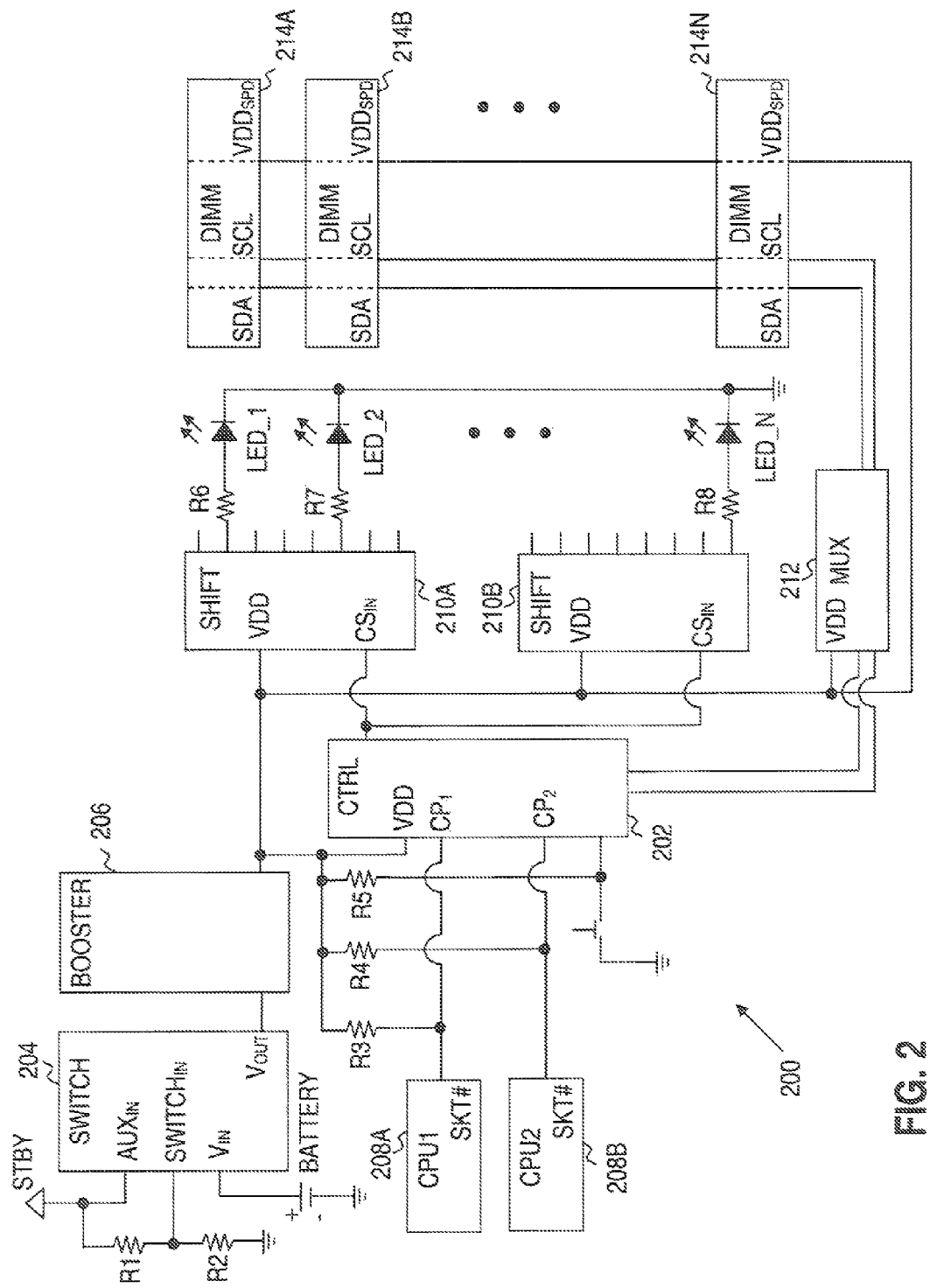
FIG. 2 shows a schematic diagram of components in accordance with embodiments of the disclosure.

FIG. 2 shows a schematic diagram 200 of components in accordance with embodiments of the disclosure. In FIG. 2, a controller 202 selectively directs a plurality of LEDs (LED_1 to LED_N) to provide component installation guidance for DIMMs 214A-214N. In FIG. 2, shift registers 210A and 2108 receive an output signal from the controller 202 and cause the LEDs to operate in accordance with an installation sequence. The installation sequence is based on input parameters received by the controller 202. For example, input parameters received from CPU1 208A and CPU2 2088 (e.g., processor type identifiers, the number of memory channels supported by a processor and/or information provided by a SKTOCC#) may affect the installation sequence. Further, input parameters received from DIMMs 214A-214N may affect the installation sequence. In accordance with at least some embodiments, the input parameters correspond to component type identifiers, component rank identifiers, serial data (SDA) and/or serial clock (SCL) information. The SDA and SCL may be obtained from a serial communication bus associated with each DIMM of the system 100 and indicates whether the DIMM is present, the rank of the DIMM or other information.

In at least some embodiments, input parameters from the DIMMs 214A-214N are propagated to the controller 202 via a multiplexer 212. The multiplexer 212 ensures that the controller 202 only has to support a threshold number of DIMMs simultaneously. For example, if the controller 202 can support up to 8 DIMMs at a time, the multiplexer 212 ensures that each channel of DIMMs has no more than 8 DIMMs.

In FIG. 2, the controller 202 is powered by a battery connected to a switch 204. The output of the switch 204 is modified by a booster circuit 206 for use as a VDD input signal for the controller 202, the shift registers 210A-210N and the DIMMs 214A-214N. As shown, various resistors (R1-R8) may be used to appropriately control voltage levels for the components of the schematic diagram 200.

In accordance with at least some embodiments, the controller 202 comprises a PIC controller (e.g., PIC16F505). In alternative embodiments, other controllers could be used (e.g., a Lattice XO2280 271 I/Os CPLD, an Altera 271 I/Os CPLD, a GromitXE). Further, the shift registers 210A and 210B may correspond to HC595 registers. Further, the battery may correspond to a 220 mAh coin battery. These components are examples only and are not intended to limit embodiments in any way.

Figure 3:
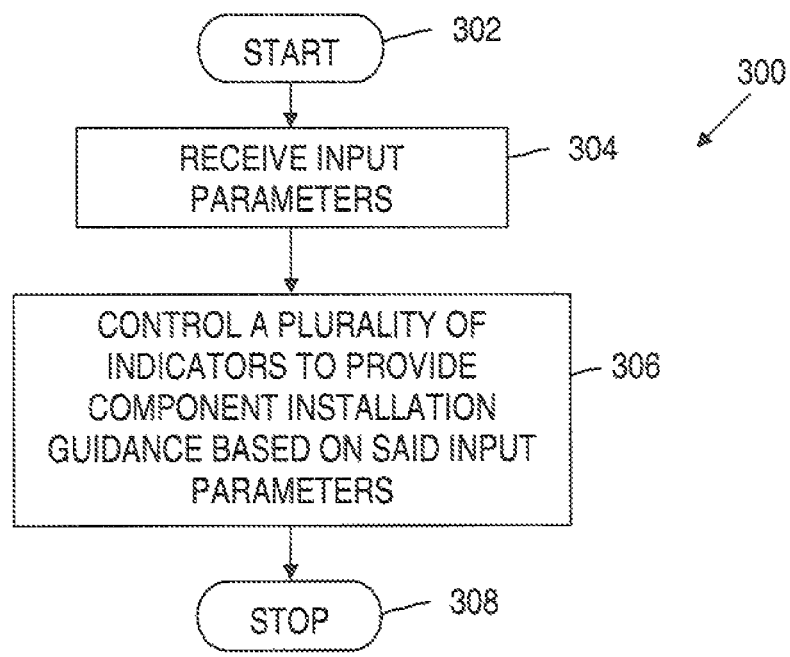
FIG. 3 shows a method in accordance with embodiments of the disclosure.

FIG. 3 shows a method 300 in accordance with embodiments of the disclosure. In FIG. 3, the method 300 starts at block 302. At block 304, input parameters are received. The input parameters can be received before or during the installation process. Although not required, the input parameters may be received while a corresponding electronic device is in a low power state (e.g., by powering parameter-providing components such as non-volatile memory, DIMM modules, processors or BIOS chips). Examples of input parameters include, but are not limited to, processor type identifiers, the number of memory channels supported by a processor, component type identifiers and/or component rank identifiers. At block 306, a plurality of indicators are controlled to provide component installation guidance based on said input parameters. The method 300 ends at block 308.

In at least some embodiments, the plurality of indicators are controlled while a corresponding electronic device is powered off. As an example, controlling the plurality of indicators (block 308) involves selectively causing: a) an indicator next to an empty slot to signal that a component should be installed in said empty slot; (b) an indicator next to an empty slot and an indicator next to an occupied slot to signal that a component should be removed from the occupied slot and installed in the empty slot; and (c) indicators next to two occupied slots to signal that the components in the occupied slots should be swapped.

Figure 4:
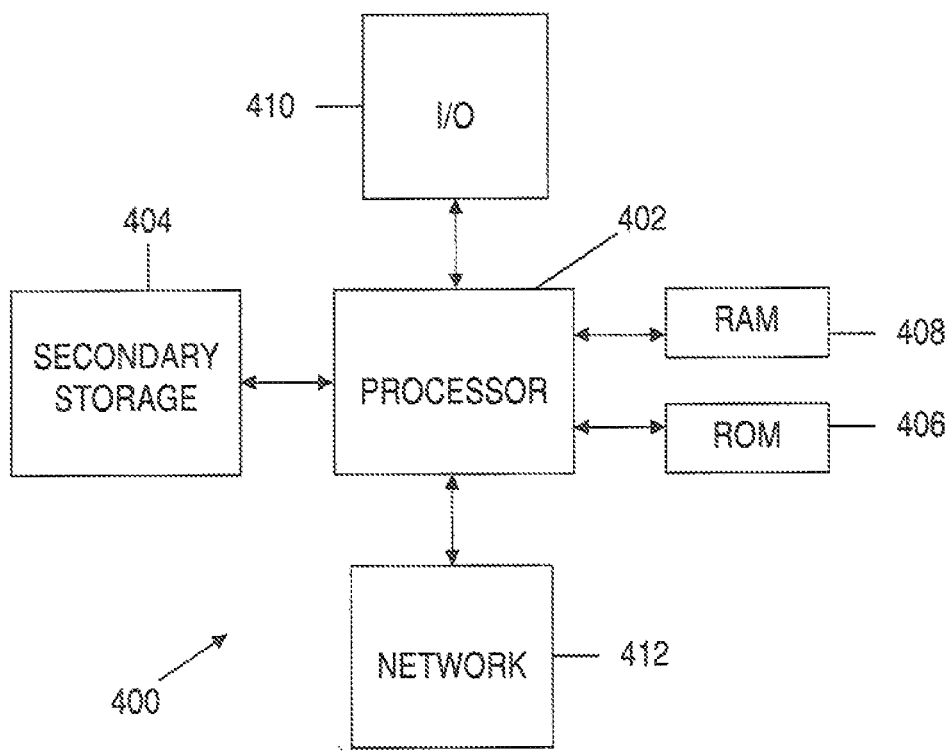
FIG. 4 shows a computer system in accordance with embodiments of the disclosure.

Without limitation to other embodiments, the components and methods described above may be implemented on a general-purpose computer or server. FIG. 4 shows a computer system 400 in accordance with embodiments of the disclosure. The computer system 400 includes a processor 402 (which may be referred to as a central processor unit or CPU) that is in communication with memory devices including secondary storage 404, read only memory (ROM) 406, random access memory (RAM) 408, input/output (I/O) devices 410, and network connectivity devices 412. The processor may be implemented as one or more CPU chips.

The secondary storage 404 is typically comprised of one or more disk drives or tape drives and is used for non-volatile storage of data and as an over-flow data storage device if RAM 408 is not large enough to hold all working data. Secondary storage 404 may be used to store programs that are loaded into RAM 408 when such programs are selected for execution. The ROM 406 is used to store instructions and perhaps data that are read during program execution. ROM 406 is a non-volatile memory device that typically has a small memory capacity relative to the larger memory capacity of secondary storage 404. The RAM 408 is used to store volatile data and perhaps to store instructions. Access to both ROM 406 and RAM 408 is typically faster than to secondary storage 404. In accordance with embodiments, the computer system 400 implements the components of FIG. 1 or 2 as well.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
   a plurality of component slots;
   at least one indicator associated with each of said slots;
   a processor; and
   a controller coupled to the indicators, wherein the indicators selectively provide installation guidance of components into said slots based on signals from the controller, and
   wherein the controller causes the indicators to vary installation guidance of components into said slots based on at least one of a processor identification received by the controller and a number of memory channels supported by the processor.

2. The system of claim 1 wherein the slots correspond to memory slots and the components correspond to memory modules.

3. The system of claim 1 wherein the controller and indicators are operational while the system is in a low-power state.

4. A system, comprising:
   a plurality of component slots;
   at least one indicator associated with each of said slots; and
   a controller coupled to the indicators, wherein the indicators selectively provide installation guidance of components into said slots based on signals from the controller, and
   wherein the controller causes the indicators to vary installation guidance of components into said slots based on at least one of a component type identification received by the controller and a component rank identification received by the controller.

5. The system of claim 1 wherein the indicators comprise at least one light emitting diode (LED) positioned near each slot.

6. The system of claim 5 wherein the controller selectively causes the at least one LED to signal a series of installation steps and, if necessary, correction steps.

7. An electronic device, comprising:
   a plurality of component slots;
   at least one indicator associated with each of said slots;
   a processor; and
   a controller coupled to the at least one indicator, wherein the controller dynamically causes the at least one indicator to signal a series of component installation steps and, if necessary, correction steps, and
   wherein the controller causes the indicators to vary installation guidance of components into said slots based on at least one of a processor identification received by the controller and a number of memory channels supported by the processor.

8. The electronic device of claim 7 wherein the controller and the at least one indicator are operative while the electronic device is in a low-power state.

9. A method, comprising:
   receiving input parameters; and
   controlling a plurality of indicators to provide component installation guidance based on said input parameters,
   wherein said controlling the plurality of indicators comprises causing the indicators to vary component installation guidance based on an input parameter that identifies a processor.

10. The method of claim 9 wherein controlling the plurality of indicators occurs while a corresponding electronic device is powered off.

11. The method of claim 9 wherein receiving said input parameters occurs while a corresponding electronic device is powered off.

12. The method of claim 9 wherein said controlling the plurality of indicators comprises causing the indicators to vary component installation guidance based on an input parameter that identifies component ranks.

13. A method, comprising:
    receiving input parameters; and
    controlling a plurality of indicators to provide component installation guidance based on said input parameters,
    wherein said controlling the plurality of indicators comprises selectively causing,
    (a) an indicator next to an empty slot to signal that a component should be installed in said empty slot,
    (b) an indicator next to an empty slot and an indicator next to an occupied slot to signal that a component should be removed from the occupied slot and installed in the empty slot,
    (c) indicators next to two occupied slots to signal that the components in the occupied slots should be swapped.

14. The system of claim 4 wherein the slots correspond to memory slots and the components correspond to memory modules.

15. The system of claim 4 wherein the controller and indicators are operational while the system is in a low-power state.

16. The system of claim 4 wherein the indicators comprise at least one light emitting diode (LED) positioned near each slot.

17. The system of claim 16 wherein the controller selectively causes the at least one LED to signal a series of installation steps and, if necessary, correction steps.

18. The method of claim 13 wherein controlling the plurality of indicators occurs while a corresponding electronic device is powered off.

19. The method of claim 13 wherein receiving said input parameters occurs while a corresponding electronic device is powered off.

20. The method of claim 13 wherein said controlling the plurality of indicators further comprises causing the indicators to vary component installation guidance based on an input parameter that identifies component ranks.

* * * * *